May 6, 1969  J. C. KIEVIT  3,442,444
GEARING ASSEMBLIES
Filed March 13, 1967
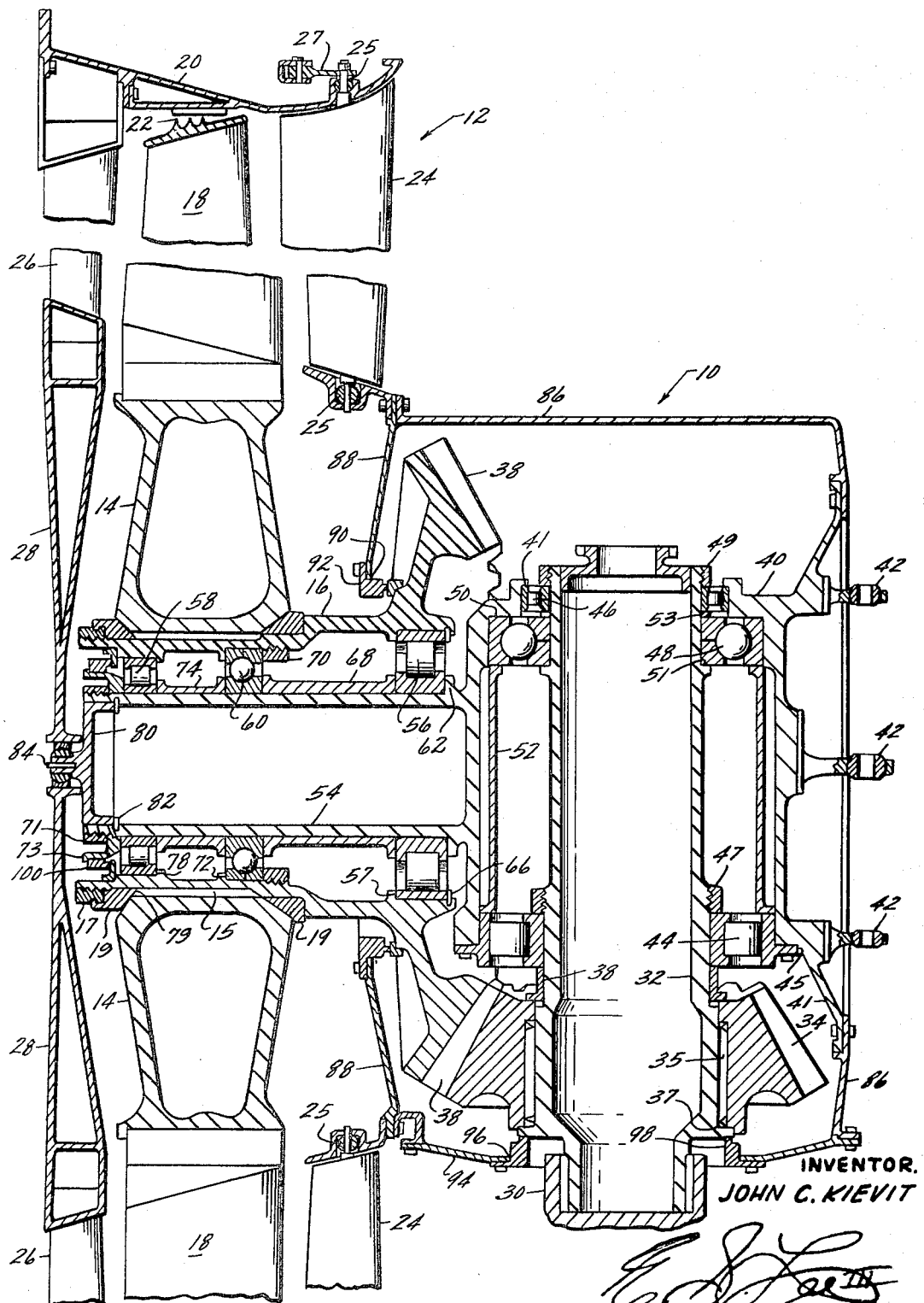
INVENTOR.
JOHN C. KIEVIT
ATTORNEY United States Patent Office 3,442,444
Patented May 6, 1969

3,442,444
GEARING ASSEMBLIES
John C. Kievit, Cincinnati, Ohio, assignor to General
Electric Company, a corporation of New York
Filed Mar. 13, 1967, Ser. No. 622,680
Int. Cl. F04d 25/02; F16h 1/14
U.S. Cl. 230—215                                         5 Claims

ABSTRACT OF THE DISCLOSURE

The disclosure illustrates a compact lightweight gearing assembly 10 for use in high speed applications, such as driving a ducted fan 12 for a vertical takeoff and landing aircraft. The gearing assembly 10 comprises an input shaft 32 which has a bevel gear 34 meshing with another bevel gear 38 on a hollow output shaft 16 at right angles to the input shaft 32. The input shaft 32 is journaled in an annular support element 40 and the output shaft is journaled around a support member 54 which forms with the annular element 40 a T-shaped support for the shafts. This arrangement minimizes the axial length of the shafts 16, 32 and enables a lightweight close-coupled mounting of the bevel gears to provide rigid support during high speed rotation.

The present invention relates to gearing assemblies and more particularly to lightweight assemblies used for high speed applications.

In recent years there has arisen a great need for lightweight compact gearing assemblies which couple a high speed output shaft of a gas turbine engine to low speed fan assemblies that provide a lifting force for helicopters, vertical takeoff and landing aircraft and air cushion vehicles.

One of the problems in satisfying the above needs is that at the normally encountered rotational input speeds (e.g. as high as 20,000 r.p.m.) the reaction loads on the gears are extremely large. As a result, the gears must be journaled for rotation by relatively large bearings and rigid support structures which adds considerable size to the gearing assembly.

Accordingly, it is an object of the present invention to provide a simplified lightweight, compact gear assembly.

The above ends are achieved by providing a gearing assembly comprising a structural member having a hollow portion and a second portion projecting therefrom intermediate its length. A first shaft is telescoped within and journaled witth respect to the hollow portion and a second shaft is telescoped over and journaled on the projecting portion. The second shaft has thereon a bevel gear means adjacent the base of the projecting portion. The first shaft has thereon a bevel gear means adjacent the hollow portion and the gear means mesh with one another so that one may be an input shaft and the other an output shaft. Therefore, the axial lengths of the shafts are minimized and the bevel gear means are rigidly journaled relative to one another.

The sole figure in the drawing is a section view of a ducted fan driven by a gearing assembly which embodies the present invention.

The figure shows a speed reduction gearing assembly or gearbox 10 for driving a ducted fan assembly 12 (only portions of which are shown). The fan assembly 12 comprises a rotatable hub 14 secured on splines 15 of an output shaft 16 of the gearbox 10 by a lock nut 17 and wedging sleeves 19. A plurality of blades 18 extend from the hub 14 for rotation which pressurizes air through a duct formed by an annular duct wall 20. A suitable seal 22 is provided between the duct wall 20 and the blade 18 to prevent leakage of air past the tip of the blades 18.

A first series of radial guide vanes 24 are disposed upstream of the fan blades 18 for directing air towards the fan blades 18 at an optimum angle. The first guide vanes 24 are pivotable by means of ball joints 25 and a bellcrank 27 to achieve an optimum entrance angle for diverse operating conditions. A second series of stator guide vanes 26, downstream of the fan blades 18, extend from the duct walls 20 to a fixed hub 28 positioned in line with the axis of the output shaft 16 of the gearbox 10. As will be described later, in detail, the guide vanes 26 and the hub 28 are sufficiently rigid to enable support of the gearbox 10.

The fan assembly 12 may have many diverse applications for pressurizing air. One such application is a ducted fan arrangement for a vertical takeoff and landing aircraft. In this case, the gearbox 10 would receive power input from an engine, such as a gas turbine, through a power shaft 30. The high rotational speed of the gas turbine is reduced and its torque output increased by the gearbox 10 to drive the fan hub 14 and blades 18 at an intermediate speed thus pressurizing the air through the duct walls 20 to provide a lift or forward thrust for the aircraft. As described below, the gearbox 10, in accordance with the present invention, is specially adapted to provide a rigid mounting of the bladed hub 14 and have a minimum weight and size.

Referring specifically to the gearbox 10, the power shaft 30 engages suitable splines on an input shaft 32. A bevel pinion gear 34 is mounted on splines 35 formed on the input shaft 32 which terminate at a shoulder 37. The bevel pinion gear 34 meshes with a bevel gear 38 integrally formed with the gearbox output shaft 16, which is hollow.

The input shaft 32 is telescoped into an annular structural support element 40 and the output shaft 16 is telescoped over a tubular support element 54 which extends from, and forms with the annular support element 40, a T-shaped support structure. A saucer like structural element 41 is integral with the annular support element 40 and has a series of brackets 42 for mounting to a suitable support structure such as the frame of an aircraft. The open end of the tubular support structure 54 has a plug 80 held therein by retaining clips 82. A ball joint 84 enables the plug to be mounted in the fixed structural hub 28.

The input shaft 32 is journaled in the annular structural element 40 by means of roller bearings 44, 46 at either end of the structural element and a ball bearing 48 intermediate the roller bearings 44, 46. The outer race of the roller bearing 46 is retained in the structural element 40 by a shoulder 41. The outer race of the ball bearing 48 is held against a shoulder 50 in the structural element 40 by a spacing ring 52 which extends to the outer race of roller bearing 44. The outer race of this roller bearing has a flange 45 which is bolted to the end of the annular element 40 to hold the outer races and spacing rings in place.

The inner race of the roller bearing 44 is positioned on the shaft 32 adjacent the apex end of the bevel pinion gear 34 by a lock nut 47 which holds the roller bearing 44 against a spacing ring 36. The spacing ring acts on the bevel pinion gear 34 to hold it against the shoulder 37. The inner races of the bearings 46, 48 are held on shaft 32 against a shoulder 51 by a lock nut 49. A spacing ring 53 maintains the bearings at some distance from one another.

The output shaft 16 is journaled around the tubular element 54 by means of roller bearings 56, 58 at opposite ends of the shaft 16 and a ball bearing 60 intermediate the roller bearings.

The inner race of the roller bearing 56 abuts a shoulder 62 at the base of the tubular element 54. Spacing rings 68, 74 extend between the inner races of bearings 56, 60, 58. The assembly of bearing races and spacing rings is held on the element 54 by a lock nut 71 acting through a seal support member 73.

The outer race of roller bearing 56 is positioned radially inward of the bevel gear 38 between a shoulder 57 and a retaining clip 66. The outer race of the ball bearing 60 is held against a shoulder 72, radially inward of the hub 14 by a lock nut 70. The outer race of the roller bearing 58 is positioned radially inward of the hub 14 between a shoulder 78 and a retaining clip 79.

Gearboxes generally utilize a lubrication system wherein pressurized lubricating fluid is injected at appropriate locations for lubrication and cooling of the bevel gears and bearing assemblies. The lubricating fluid is then scavanged by a pump (not shown) and transmitted to a supply tank for recirculation. In order to contain the lubricating fluid around the gears and bearing assemblies, a series of lightweight ducts are provided to form, in combination with the support elements, a sump chamber for the gearbox 10.

A generally annular thin wall element 86 bolts to the saucer-shaped support element 41 and to a circular thin walled base plate 88 which has an opening 90 through which the output shaft 16 extends. A second thin walled access plate 94 has an opening 96 through which the input shaft 32 and the power shaft 30 extend.

A suitable carbon seal assembly 92 is mounted between the opening 90 and the base of the bevel gear 38 to provide a seal for lubricating fluid. Another carbon seal assembly 98 is bolted to the plate element 94 and acts against the input shaft 32 to provide a second seal for lubricating fluid. The annular space between the structural support element 54 and the hollow output shaft 16 is sealed by a third carbon seal 100 engaging the seal support element 73 so that the interior of the hollow output shaft 16 forms a part of the sump chamber for the gearbox 10.

In operation, the sahft 32 receives a torque input from the power shaft and through the meshing of the bevel gears 34 and 38, drives the output shaft 16 and bladed hub 14. As previously stated, substantial radial reaction loads are generated on the bevel gears 34, 38 and in addition, substantial radial and axial loads are genereated on the bladed hub 14.

Since the bevel gear 38 is mounted for rotation over the support element 54, the roller bearing 56 may be radially aligned with the gear to provide a direct path for the radial loads to the support 54 and minimize the deflection of the output shaft 16. In addition, the rotational mounting of the pinion bevel gear 34 from its apex side enables positioning of the roller bearing 44 sufficiently close to the gear 34 to minimize its overhang and minimize the deflection of shaft 32. The hollow output shaft 16 additionally enables the roller and ball bearings to be radially aligned with the bladed hub 14, to provide direct paths for the aerodynamic loads on the hub 14 to the support 54 to greatly minimize the deflection of shaft 16.

The supports 40 and 54, on which the shafts 32, 16 are mounted, provide a compact close coupled support of the bevel gears 34, 32. This close coupled support minimizes bending and other stresses generated in the supports by the gear reaction loads, thereby minimizing the deflection of the gears relative to one another to enable more efficient operation of the gearbox 10.

It is also apparent that the T shaped support formed by the annular support 40 and support 54 enables an extremely compact and lightweight gearbox, which has great utility in powering fans for vertical takeoff and landing aircraft.

Another advantage presented by the use of the T shaped support is that the fan hub 14 may be supported for rotation on both sides, namely through mounting brackets 42 and structural hub and vanes 28, 26 instead of the usual cantilevered mounting arrangement. By distributing the loads on both sides of the bladed hub, the weight of the supporting structure may be minimized.

Furthermore, weight savings in the gearbox 10 are gained by the fact that the sump chamber for the gears and bearings is not formed by a rigid outer casing that forms a structural support, but by walled elements 86, 88, 94 of minimum thickness. In this connection, the output shaft 16 not only transmits the output of the gearbox but doubles as a portion of the sump chamber by the provision of the seal 100 between the shaft 16 and the support 54.

It is apparent from the foregoing that the gearing assembly described provides an extremely compact, rigid, lightweight support for high speed gearshafts. While the invention has been described in connection with a fan assembly for a vertical takeoff and landing aircraft, it is to be understood that the principles described herein may be equally applicable to gearing assemblies in general with equivalent results. Accordingly, the scope of the present invention is to be limited solely by the appended claims.

Having thus described the invention, what is claimed as novel and desired to be secured by Letters Patent of the United States is:

1. A gear assembly comprising:
a structural member having a hollow portion and a portion projecting therefrom intermediate its length,
a first shaft telescoped within said hollow portion of said structural member,
a second hollow shaft telescoped over said projecting portion of said structural member,
bevel gear means carried by said first and second shafts to transmit torque between said first and second shafts,
bearing means journaling said first and second shafts for rotation with respect to said structural member and including radial thrust absorbing bearing means for said first and second shafts, with
said bearing means for said second shaft having inner races mounted on said projecting portion of said structural member and outer races mounted on said second shaft and with said radial thrust absorbing bearing means for said second shaft being substantially axially aligned with the portion of said bevel gear means carried by said second shaft to thereby reduce the axial length of said second shaft and the deflection of said second shaft due to radial loads.

2. A gear assembly as in claim 1 wherein,
said radial thrust absorbing bearing means for said first shaft comprises a first roller bearing assembly positioned on the end of said hollow structural member closely adjacent the bevel gear means therefor,
the bearing means for said first shaft further includes:
a second roller bearing assembly positioned in the end of said hollow structural member away from said bevel gear means,
a thrust bearing assembly positioned in said hollow structural member intermediate said roller bearings,
said radial thrust absorbing bearing means for said second shaft comprises a first roller bearing assembly positioned on the projecting portion of said structural member,
the bearing means for said second shaft further includes:
a second roller bearing assembly positioned on the end of said projecting portion away from said bevel gear means,
a thrust bearing assembly positioned on said projecting portion intermediate said roller bearings,
whereby axial and radial loads on said first and second shafts are resisted.

3. A gear assembly as in claim 2 wherein said gear assembly is lubricated by lubricating fluid and said gear assembly further comprises:

relatively thin wall chamber means surrounding said bevel gear means and secured to said hollow structural member, said chamber means having a first opening in alignment with one end of said first shaft and a second opening through which said second shaft extends, first annular seal means disposed in said openings for sealing the interior of said chamber means, second annular seal means disposed between said second shaft and said structural element, whereby said chamber means forms a lightweight sump chamber in combination with said second shaft for containment of said lubricating fluid.

4. A gear driven fan including, in combination:

a structural member having a hollow portion and a second portion projecting therefrom intermediate its lengths, a first shaft telescoped within and journaled with respect to said hollow portion, a second hollow shaft telescoped over and journaled on said projecting portion, said second shaft having thereon a bevel gear means adjacent the base of said projecting portion, said first shaft having thereon a bevel gear means adjacent said hollow portion, said gear means meshing so that one may be an input shaft and the other an output shaft, whereby the axial lengths of said shafts are minimized and the bevel gear means are rigidly journaled relative to one another, a rotatable bladed hub mounted on said second shaft for pressurizing air, a fixed hub mounted to the end of the projecting portion of said structural member, a series of radial structural members extending from said fixed hub for support exterior of said bladed hub, whereby said bladed hub may be supported for rotation by said hollow structural support member and said structural vanes.

5. Apparatus as in claim 4 wherein said bearing means for said second shaft include:

radial thrust absorbing bearing means positioned on the projecting portion of said structural member in line with said rotatable bladed hub, axial thrust absorbing bearing means positioned on said projecting portion in line with said rotatable hub, whereby aerodynamic loads on said bladed hub are resisted by the projecting portion of said structural member.

References Cited

UNITED STATES PATENTS

| | | | |
|---|---|---|---|
| 616,349 | 12/1898 | Parker | 74—417 XR |
| 2,665,859 | 1/1954 | Papadakos | 170—135.75 XR |

ROBERT M. WALKER, *Primary Examiner.*

U.S. Cl. X.R.

74—417